United States Patent

Comley

[15] 3,638,781

[45] Feb. 1, 1972

[54] CONVEYOR BELT-TENSIONING MEANS

[72] Inventor: Peter Donald Heywood Comley, Glasgow, England

[73] Assignee: Movor & Coulson Limited, Great Britain

[22] Filed: Jan. 29, 1971

[21] Appl. No.: 110,827

[30] Foreign Application Priority Data

Jan. 30, 1970 Great Britain..................04,525/70

[52] U.S. Cl. ....................198/208, 74/242.11 C, 254/172
[51] Int. Cl.......................................B65g 15/30
[58] Field of Search...........................198/208, 16; 254/172; 74/242.11 C, 242.14

[56] References Cited

UNITED STATES PATENTS 3,275,126  9/1966  Hartzell.................198/208
3,537,573  11/1970  Tangye et al. ..................198/208

Primary Examiner—Evon C. Blunk
Assistant Examiner—Alfred N. Goodman
Attorney—Mason, Fenwick & Lawrence

[57] ABSTRACT

An endless conveyor has belt-tensioning means comprising two devices adapted and arranged to sense and signal variations in the tensions in the working and return runs of the belt respectively due to change of load conditions, a drum around which the return run of the belt passes and which is displaceable so as to vary the tensions in the belt, speed-variable driving gear adapted to effect said displacement of the drum, and means adapted to effect actuation of said driving gear in response to signals emitted by said devices when said tensions are not at a predetermined ratio, and to effect variation in the speed of said gear, and hence of the displacement of the drum, in accordance with the signal characteristics which vary in accordance with the rate at which tension change in the belt takes place due to variation in load conditions.

7 Claims, 3 Drawing Figures

Inventor
PETER DONALD HEYWOOD COMLEY
By
Mason, Fenwick & Lawrence
Attorneys

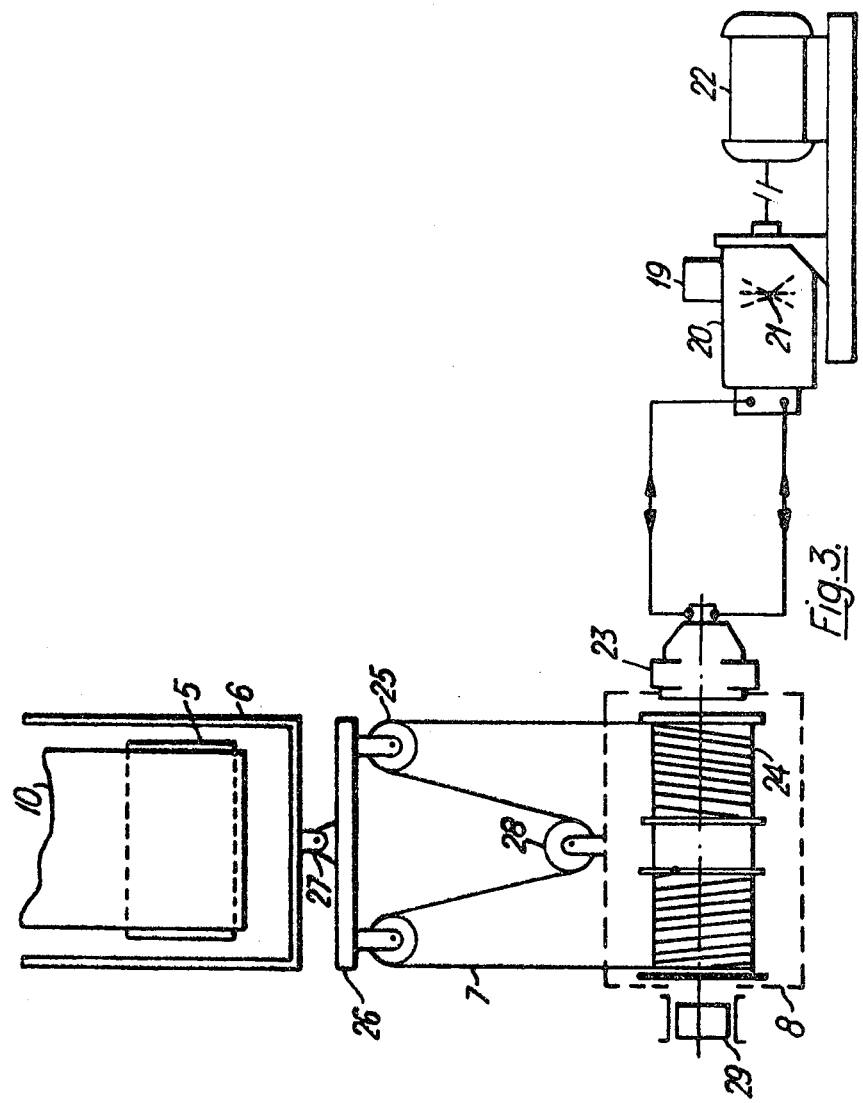

CONVEYOR BELT-TENSIONING MEANS

This invention relates to an endless conveyor and to tensioning means for the endless member thereof, hereinafter referred to as a belt.

Most known belt conveyors include means for tensioning the conveyor belt and such means usually comprises a carriage carrying a drum over which the belt passes. The carriage is normally referred to as a loop carriage and is coupled to a cable to which tension may be applied by means of weights acting under the influence of gravity, or by a powered winch.

Such known tensioning means takes up slack belt in the system, and automatically adjusts according to the laden conditions of the conveyor, i.e., with increasing load, belt stretch occurs which is taken up by the tensioning means hauling in the loop carriage, and, conversely, with decreasing load, belt contraction occurs, and the belt is released by an appropriate amount.

However, all such known tensioning means have to cater for the maximum belt stretch that occurs under full load conditions, and are therefore tensioned for this peak load condition. This means that, whenever the conveyor is only lightly loaded, or even empty, the belt is overtensioned for the conditions pertaining.

A further aspect of winch-operated tensioning means is the rate of operation of the winches. It is important that slack in the belt is taken up by the tensioning means at a rate commensurate with the rate at which the slack is being formed.

Slack belt is normally formed at a maximum rate when starting up conveyor in the fully laden condition, and this rate may well be 20 to 30 times the rate of stretch for small-load changes.

The winches, however, are at present designed to operate at a speed commensurate with the maximum rate of stretch, and consequently operate at too high a speed for all operating conditions other than the fully laden start. In order to mitigate the possibility of hunting occurring when this speed is higher than demanded by operating conditions it is sometimes necessary to build in a damping system, thus adding expense and complication to the tensioning equipment.

An object of the present invention is to provide conveyor-tensioning means that automatically tensions the belt to a tension commensurate with the loading conditions, and preferably operates at speeds commensurate with the rate at which belt stretch, or contraction, occurs.

According to the present invention we provide an endless conveyor having belt-tensioning means comprising two devices adapted and arranged to sense and signal variations in the tensions in the working and return runs of the belt respectively due to change of load conditions, a drum around which the return run of the belt passes and which is displaceable so as to vary the tensions in the belt, speed-variable driving gear adapted to effect said displacement of the drum, and means adapted to effect actuation of said driving gear in response to signals emitted by said devices when said tensions are not at a predetermined ratio, and to effect variation in the speed of said gear, and hence of the displacement of the drum, in accordance with the signal characteristics which vary in accordance with the rate at which tension change in the belt takes place due to variation in load conditions.

Preferably, said driving gear includes a swashplate pump of which the tilt of the swashplate is controlled by said signal responsive means.

Preferably also, the arrangement is such that when the ratio of the tensions is that predetermined, the signals are of equal magnitude, and the degree of tilt of the swashplate equal magnitude, and the degree of tilt of the swashplate increases with the degree of imbalance between the signals.

Preferably also, the movement of said drum is effected by a winch driven by a hydraulic motor fed by said pump.

Each of said devices may be a load cell of hydroelastics or electrical form.

Preferably, said devices are actuated by pivotal frames carrying rollers around which the working and return runs of the belt pass respectively.

Said signal responsive means may be an electrohydraulic servovalve, in which the electrocontrol is a servomotor. The theory of the invention is based upon the belt-drive formula $$T/t = e^{\mu\theta}$$

where
$T$ = Tight side tension of belt
$t$ = Slack side tension of belt
$e$ = Constant
$\mu$ = Coefficient of friction between belt and drive drums
$\theta$ = Angle of wrap of belt around drive drums.

Now for any given drive, $e$, $\mu$ and $\theta$ remain constant for all loading conditions, therefore $T$ and $t$ will be directly proportional to each other, irrespective of the load carried by the conveyor.

If these two tensions are measured in the form of signals, and compared with one another, they should be in balance when the tensions are at the correct ratio for the drive. An increase in load on the conveyor causes an increase in $T$ tension with consequent increase in its signal output, the two signals then being out of balance. This out-of balance can be converted to a voltage of, say, positive form, and by suitable amplification used to pilot operate the tension winch to take in belt in order to restore the correct ratio of $T/t$ tensions.

Conversely, a decrease in load on the conveyor causes a decrease in $T$-tension with consequent reduction in its signal output, the two signals then being out of balance. This out of balance is again converted to a voltage, but of negative form, and by suitable amplification is used to pilot operate the tension winch to pay out belt so as to restore the correct ratio of $T/t$ tensions.

An embodiment of the invention will now be described, by way of example, with reference to the accompanying diagrammatic drawings, in which:

FIG. 3 shows the winch and driving gear.

Figure 1:
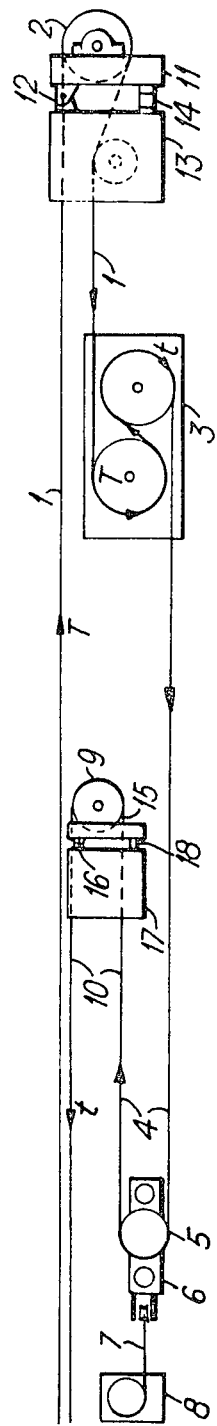
FIG. 1 shows a side view of a conveyor head and tensioning means according to the present invention.
Figure 2:
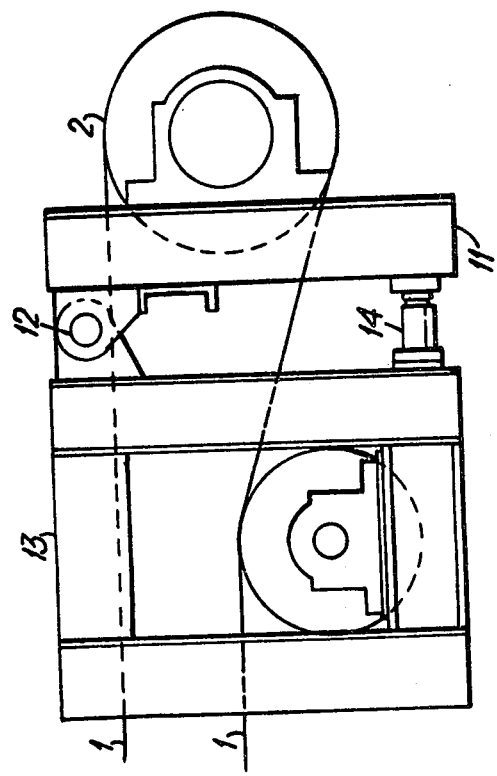
FIG. 2 shows the tensioning sensing and signalling devices of FIG. 1 to a larger scale.
Figure 2:
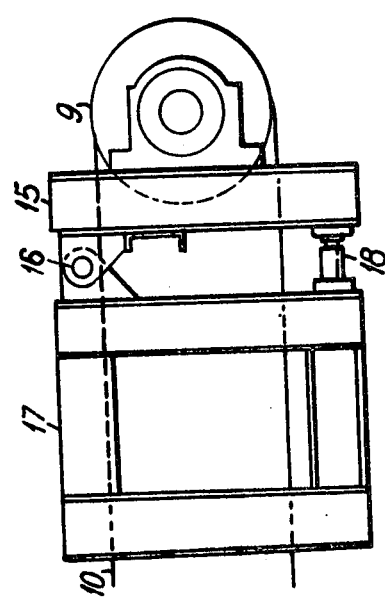

The belt conveyor itself is of well-known form and its upper run 1 passes over a jib drum 2 before passing to a driving head 3. Behind the driving head 3 of the conveyor, a loop 4 is formed in the conveyor belt which passes over a drum 5 mounted upon a loop takeup carriage 6. The carriage 6 is capable of limited travel by means of a cable 7 which is attached to a winch 8, to be described in greater detail below. The belt then passes from the loop over a drum 9 and continues to the tail end of the conveyor. The working run 1 of the belt is subject to $T$ tensions, and the return run 10 of the belt is subject to $t$ tensions.

The jib drum 2 is mounted in a frame 11, and the frame 11 is pivoted on a hinge pin 12 from a jib box 13. The lower end of the pivoted drum frame 11 rests against a load-measuring or sensing and signalling device 14, which may be a load cell either of hydroelastic or electrical form which is mounted on the jib box 13.

With this arrangement, a predetermined proportion of the $T$ tension to which the jib drum 2 is subjected, is supported and measured by the load cell 14.

In a similar manner the drum 9 is mounted on a frame 15, and the frame 15 is pivoted on a hinge pin 16 from a structure 17. The lower end of the pivoted drum frame 15 rests against another load-measuring or sensing and signalling device 18, which may be a load cell either of hydroelastic or electrical form which is mounted on the structure 17.

With this arrangement a predetermined proportion of the $t$ tension to which the drum 9 is subjected, is supported and measured by the load cell 18.

The load cells 14 and 18 are calibrated so that their outputs are of equal magnitude when the tensions $T$ and $t$ are in the proportion $T/t = e^{\mu\theta}$ for the particular drive concerned.

The outputs of the load cells 14, 18 are monitored and compared one with the other. If the tension in belt run 1 increases, the load on the cell 14 increases, in proportion, and this then puts the signal out of balance with the signal from cell 18. This out of balance may be considered to be of positive form, and is suitably amplified to signal the loop winch 8 to take in the belt so as to restore equilibrium between $T$ and $t$ for the new conditions.

Conversely, if tension in the belt run 1 decreases, the load on the cell 14 decreases in proportion, and this again puts the signal out of balance with the signal from the cell 18. This out of balance may be considered to be of negative form, and is suitably amplified to signal the loop winch 8 to pay out belt so as to restore equilibrium between $T$ and $t$ for the new conditions.

The amplified signal of positive or negative form is employed to operate an electrohydraulic servo valve 19, in which the electrocontrol may be a servomotor.

The control valve 19 is directly coupled to the swashplate tilt shaft (not shown) of a swashplate pump 20, whose swashplate 21 is capable of tilt to each side of the vertical so as to provide duo directional variable output.

The pump 21, which is driven by an electric motor 22, supplies oil to a slow speed, high-torque hydraulic motor 23, which is coupled direct to the drum 24 of the winch 8. The pump and motor operate on a closed hydraulic circuit.

The loop carriage 6 is coupled to the winch unit 8 via a rope and pulley system, one method being as indicated in FIG. 3. Two rope pulleys 25 are attached to a pivot frame 26, which, in turn, is attached to the loop carriage 6 via a pivot pin assembly 27. This arrangement ensured correct tracking of the loop carriage over the full extent of its travel.

The rope 7 is attached to the winch drum 24, the end portions of the rope being wound on to end portions of the drum 24, and the middle portion of the rope passing around the pulleys 25 and a pulley 28, which is attached centrally to the winch frame 8. With the arrangement as shown, slack belt is taken up by winding the rope on to the winch drum 24, and hauling the loop carriage towards the winch 8. Conversely, belt is paid out by winding rope off the winch drum 24 and allowing the carriage to move away from the winch 8.

When the winch 8 is not operating, the winch drum 24 is held stationary by a brake 29, indicated diagrammatically, which may be spring or weight applied 'ON,' and hydraulically powered 'OFF.'

Whenever the winch is operated, initial hydraulic pressure in the system is employed to release the brake, thus the brake fails safe in the event of hydraulic failure, and is not normally released until the pump swashplate 21 has been actuated by an out of balance signal from the $T$ and $t$ load cells 14, 18, and consequently the loop is always under full control of the winch.

It can be seen from the above description that the embodiment provides an automatic loop control that tensions the belt run 10 in proportion to the loading on belt run 1, so that the predetermined tension ratio $T/t$ can be maintained substantially constant.

Now the strength of the out of balance signal between the load cells 14 and 18 directly determines the angle through which the swashplate 21 is tilted in pump 20, thus determining the output from the pump 20 and the speed of winch operation.

If there is a very rapid change in balance between the two load measuring devices, such as occurs when starting up a laden conveyor, then there is a large signal output with consequent rapid operation of the loop winch to restore equilibrium. As equilibrium is being restored the out of balance force diminishes progressively, bringing the swashplate 21 back towards the vertical (or no output) position, slowing down the loop winch 8 until the winch is slowed to a stop as the tensions come back into balance and the swashplate 21 comes vertical.

If there is only a small change in out of balance between the load-measuring devices 14, 18, such as occurs when the load on the belt is increasing or decreasing, then there is only a proportionately small movement of the swashplate 21 with low pump output and slow winch operation.

Thus, it can be seen that also in the embodiment described the rate of takeup or paying-out is commensurate with the rate at which belt slack or contraction is formed.

What is claimed is:

1. An endless conveyor having belt tensioning means comprising, two devices adapted and arranged to sense and signal variations in the tensions in the working and return runs of the belt respectively due to change of load conditions, a drum around which the return run of the belt passes and which is displaceable so as to vary the tensions in the belt, speed-variable driving gear adapted to effect said displacement of the drum, and means adapted to effect actuation of said driving gear in response to signals emitted by said devices when said tensions are not at a predetermined ratio, and to effect variation in the speed of said gear, and hence of the displacement of the drum, in accordance with the signal characteristics which vary in accordance with the rate at which tension change in the belt takes place due to variation in load conditions.

2. An endless conveyor having belt-tensioning means as claimed in claim 1 wherein, said driving gear includes a swashplate pump of which the tilt of the swashplate is controlled by said signal responsive means.

3. An endless conveyor having belt-tensioning means as claimed in claim 2 wherein, the arrangement is such that when the ratio of the tensions is that predetermined, the signals are of equal magnitude, and the degree of tilt of the swashplate increases with the degree of imbalance between the signals.

4. An endless conveyor having belt-tensioning means as claimed in claim 3 wherein, the movement of said drum is effected by a winch driven by a hydraulic motor fed by said pump.

5. An endless conveyor having belt-tensioning means as claimed in claim 4 wherein, each of said devices may be a load cell of hydroelastics or electrical form.

6. An endless conveyor having belt-tensioning means as claimed in claim 5 wherein, said devices are actuated by pivotal frames carrying rollers around which the working and return runs of the belt pass respectively.

7. An endless conveyor having belt-tensioning means as claimed in claim 6 wherein, the amplified signal from the load cells of positive or negative form is employed to operate an electrohydraulic servovalve in which the electrocontrol may be a servomotor.

* * * * *

UNITED STATES PATENT OFFICE
CERTIFICATE OF CORRECTION

Patent No. 3,638,781　　　　　　　Dated　February 1, 1972

Inventor(s)　Peter Donald Heywood Comley

It is certified that error appears in the above-identified patent and that said Letters Patent are hereby corrected as shown below:

First page, left hand column, in the line identified by designator code [72], change the address of the inventor to read --Glasgow, Great Britain--, and in the line identified by designator code [73], the name of the assignee should read --Mavor & Coulson Limited--.

Signed and sealed this 19th day of September 1972.

(SEAL)
Attest:

EDWARD M. FLETCHER, JR.　　　　　ROBERT GOTTSCHALK
Attesting Officer　　　　　　　　Commissioner of Patents